(12) United States Patent
Kayama et al.

(10) Patent No.: US 7,457,622 B2
(45) Date of Patent: Nov. 25, 2008

(54) RADIO BASE STATION SELECTION METHOD AND SYSTEM AND A RADIO BASE STATION IN A MOBILE COMMUNICATION SYSTEM

(75) Inventors: Hidetoshi Kayama, Yokohama (JP); Lan Chen, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 293 days.

(21) Appl. No.: 10/196,196

(22) Filed: Jul. 17, 2002

(65) Prior Publication Data

US 2003/0017838 A1 Jan. 23, 2003

(30) Foreign Application Priority Data

Jul. 18, 2001 (JP) ............................. 2001-218379

(51) Int. Cl.
*H04Q 7/20* (2006.01)
*H04Q 7/00* (2006.01)

(52) U.S. Cl. ...................... 455/437; 455/442; 370/332

(58) Field of Classification Search ................ 455/425, 455/436–439, 442–453
See application file for complete search history.

(56) References Cited

U.S. PATENT DOCUMENTS 5,442,807 A 8/1995 Takayama
5,655,005 A * 8/1997 Wiedeman et al. .......... 370/320
5,867,789 A 2/1999 Olds et al.
6,088,590 A * 7/2000 Anderson et al. ........... 455/437
6,178,329 B1 1/2001 Chao et al.
6,591,103 B1 * 7/2003 Dunn et al. ................. 455/436
2002/0151308 A1 * 10/2002 Baba et al. .................. 455/446
2004/0048616 A1 * 3/2004 Kobylinski et al. ......... 455/436

FOREIGN PATENT DOCUMENTS

| JP | 4-180314 | 6/1992 |
|----|----------|--------|
| JP | 2001-189954 | 7/2001 |
| KR | 2000-0007771 | 2/2000 |

\* cited by examiner

*Primary Examiner*—Duc Nguyen
*Assistant Examiner*—Michael T Thier
(74) *Attorney, Agent, or Firm*—Oblon, Spivak, McClelland, Maier & Neustadt, P.C.

(57) ABSTRACT

In a mobile communication system having a plurality of radio base stations and a mobile station, a radio base station selection method in which a radio base station to start communicating with a mobile station is selected from among adjacent radio base stations capable of communicating with the mobile station is provided. The method includes the steps of requiring, by a radio base station in service, a radio channel availability report from each of adjacent radio base stations indicated by the mobile station, in response to a signal for requesting connection to the mobile station; selecting a radio base station to be connected to the mobile station, based on the radio channel availability reports obtained from the adjacent radio base stations; and notifying the mobile station of information necessary for communicating with the selected radio base station.

19 Claims, 7 Drawing Sheets

| MOBILE STATION # | REQUIRED BANDWIDTH | ADJACENT STATION | RECEPTION LEVEL | AVAILABLE CAPACITY |
|---|---|---|---|---|
| #1 | 32kbps | 1-2 | 50dBm | 8kbps |
| | | 1-3 | 43dBm | 64kbps |
| | | 1-4 | 35dBm | 384kbps |

RADIO BASE STATION SELECTION METHOD AND SYSTEM AND A RADIO BASE STATION IN A MOBILE COMMUNICATION SYSTEM

BACKGROUND OF THE INVENTION

The present invention relates to a radio base station selection method in a mobile communication system. More specifically, the present invention relates to such a radio base station selection method and system in which a radio base station is selected when a mobile station sends or receives a call or performs a handoff in a mobile communication system.

In addition, the present invention relates to a radio base station which can select another radio base station according to such a radio base station selection method.

At present, cellular mobile communication systems such as the PDC (Personal Digital Cellular) system and the PHS (Personal Handy phone System) are operated. In these mobile communication systems, selection of a radio base station when sending/receiving a call or handing off is carried out as explained below.

In the case of PHS, Selection by a mobile station:

When establishing connection for sending/receiving a call in the PHS, a mobile station sends a request for establishing a link channel to a radio base station, in order to get a radio channel allocation. If the radio base station has an available radio channel, it assigns a link channel to the mobile station. On the other hand, if the radio base station does not have an available radio channel, it sends a link channel assignment rejection to the mobile station. After receiving the link channel assignment rejection, the mobile station searches for other radio base stations with an available radio channel. The mobile station repeats the search until it finds a vacant radio channel or it reaches a predetermined repetition time.

In the PHS system, when the quality of communication between a mobile station and a radio base station is degraded (reception quality degradation), a handoff sequence is activated. Then the mobile station searches control frequencies for a control signal from adjacent radio base stations. If the mobile station receives a control signal, it becomes synchronized with the control signal, and sends a request for establishing a link channel to the adjacent radio base station to handoff in a manner similar to the above. The subsequent process is the same as the above.

In the PHS system, 64 kbps data transmission can be obtained by using two time-shared slots. When the radio base station receives the request for establishing a link channel, it assigns the first slot link channel. The mobile station sends an additional request for Tch (communication channel) using the assigned link channel to request an additional slot. If the radio base station has an available radio channel, it assigns one additional channel. If the radio base station has no available radio channels, it sends a Tch additional assignment rejection to the mobile station. The mobile station sends Tch additional requests again to the radio base station, until the request is accepted or it reaches a predetermined repetition time.

In the case of PDC, Selection by a radio base station:

In the PDC network, a radio base station control station is provided above the radio base stations to control radio channel assignment/switching. A mobile station measures received levels of the control channels of adjacent radio base stations. When sending/receiving a call, the mobile station sends a call establishing signal and the received levels. If a radio base station in the service of which the mobile station belongs has no available radio channel, the radio base station control station asks adjacent radio base stations about their channel availabilities based on the received levels reported by the mobile station. If some adjacent radio base stations have channel availabilities, the radio base station control station selects a radio channel and notifies the mobile station of the selection.

A handing off is activated when the received level of the radio communication link is degraded. During spare time in TDMA slots, the mobile station checks the received levels of adjacent radio base stations. The mobile station reports the received levels to the radio base station control station periodically. When the quality of communication link is degraded, the radio base station control station notifies the mobile station of a radio base station to hand off, based on the received levels of the adjacent radio base stations reported from the mobile station.

It is necessary to broaden the bandwidth per channel in order to improve radio transmission speed in the present mobile communication system. However, a high frequency band is needed for assuring a broad frequency bandwidth. In addition, in order to satisfy subscriber capacity required in the system, frequency efficiency should be improved to higher than the conventional system. Judging from these factors, a micro-cell (about 100 m to 300 m) is expected to be used for realizing high speed access in future mobile communication systems.

In such a micro-cell configuration, the number of radio channels covered by one radio base station is usually small, because the service area is covered by many radio channels. Therefore, if many mobile stations come together in a radio zone covered by one radio base station, all the radio channels of the radio base station are easily occupied, and can not provide the required communication service.

Solutions for preventing the above situation includes increasing the number of radio channels per radio base station, and placing multiple radio base stations close to each other to increase the traffic capacity per area. The former solution requires additional hardware in radio base stations and results in high cost, and therefore, the latter solution is usually desired.

In the micro-cell configuration, the number of hand-offs will be increased because of the small cell size. FIG. 8 shows a mobile station traversing micro-cells. In this figure, when the mobile station moves along a path 6-1, it is handed off at locations 6-7, 6-8 and 6-9 to switch radio areas from 6-2 to 6-3, 6-4 and 6-5, respectively. As shown in the figure, the number of hand-offs is increased in the micro-cell system, therefore it is important to shorten hand-off time as much as possible. Therefore, it is important to find an available radio channel as fast as possible. This problem occurs when sending/receiving a call as well as handing off.

In the PHS system as explained above, there is no need for controlling radio base stations. However, searching time to find a radio base station having an available radio channel is very long, leading to many problems.

In the PDC system as explained above, radio channels can be assigned with high speed and high efficiency. However, it needs radio base station control stations above radio base stations, which complicates the network and increases network cost.

SUMMARY OF THE INVENTION

It is an object of the present invention to provide a radio base station selection method and system in which network cost is not increased, and searching time for available radio channels is shortened to assign radio channels with high speed.

It is another object of the present invention to provide a radio base station used in such a system.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by a method, a system and an apparatus particularly pointed out in the specification in such full, clear, concise, and exact terms as to enable a person having ordinary skill in the art to practice the invention.

In a mobile communication system having a plurality of radio base stations and a mobile station, a radio base station selection method according to the present invention is provided, in which a radio base station to start communicating with a mobile station is selected from among adjacent radio base stations capable of communicating with the mobile station. The method comprises the steps of: requiring, by a radio base station in service, a radio channel availability report from each of adjacent radio base stations indicated by the mobile station, in response to a signal for requesting connection to the mobile station; selecting a radio base station to be connected to the mobile station, based on the radio channel availability reports obtained from the adjacent radio base stations; and notifying the mobile station of information necessary for communicating with the selected radio base station.

In a mobile communication system having a plurality of radio base stations and a mobile station, a radio base station selection system according to the present invention is provided, in which a radio base station to start communicating with a mobile station is selected from among adjacent radio base stations capable of communicating with the mobile station. The system comprises a radio base station in service. The radio base station in service comprises: radio channel availability requiring means for requiring a radio channel availability report from each of adjacent radio base stations indicated by the mobile station, in response to a signal for requesting connection to the mobile station; radio base station selecting means for selecting a radio base station to be connected to the mobile station, based on the radio channel availability reports obtained from the adjacent radio base stations; and notifying means for notifying the mobile station of information necessary for communicating with the selected radio base station.

A radio base station to be selected as a radio base station capable of communicating with a mobile station, according to the present invention, is provided. The radio base station comprises radio channel availability requiring means for requiring a radio channel availability report from each of adjacent radio base stations indicated by the mobile station, in response to a signal for requesting connection to the mobile station; radio base station selecting means for selecting a radio base station to be connected to the mobile station, based on the radio channel availability reports obtained from the adjacent radio base stations; and notifying means for notifying the mobile station of information necessary for communicating with the selected radio base station.

DESCRIPTION OF THE PREFERRED EMBODIMENTS

In the following, embodiments of the present invention will be described with reference to the accompanying drawings.

Figure 1:
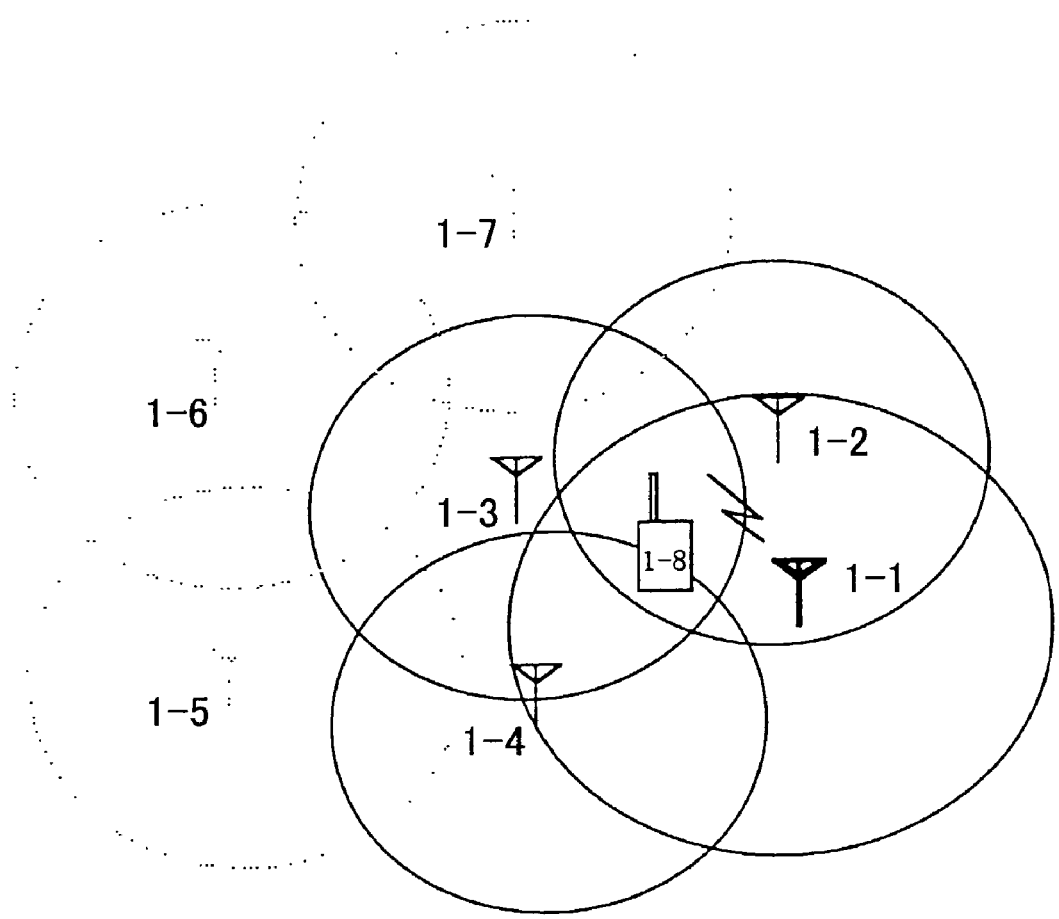
FIG. 1 shows a basic configuration of a mobile communication system to which one embodiment of the present invention is applied.

FIG. 1 shows a basic configuration of a mobile communication system to which one embodiment of the present invention is applied.

Referring to FIG. 1, this mobile communication system is composed by a plurality of radio base stations 1-1 through 1-7, each of which has a micro-cell as a radio zone.

Each radio base station 1-1 through 1-7 is connected to a predetermined communication network.

There are radio/wired connections between each radio base station, and therefore these radio base stations can communicate with each other.

In this embodiment, it is assumed that each radio base station 1-1 through 1-7 is wire-connected to each other.

As shown in the figure, a mobile station 1-8 belongs to the radio base station 1-1, but it is within a range where it can communicate with three adjacent radio base stations 1-2, 1-3 and 1-4.

Figures 2, 3:
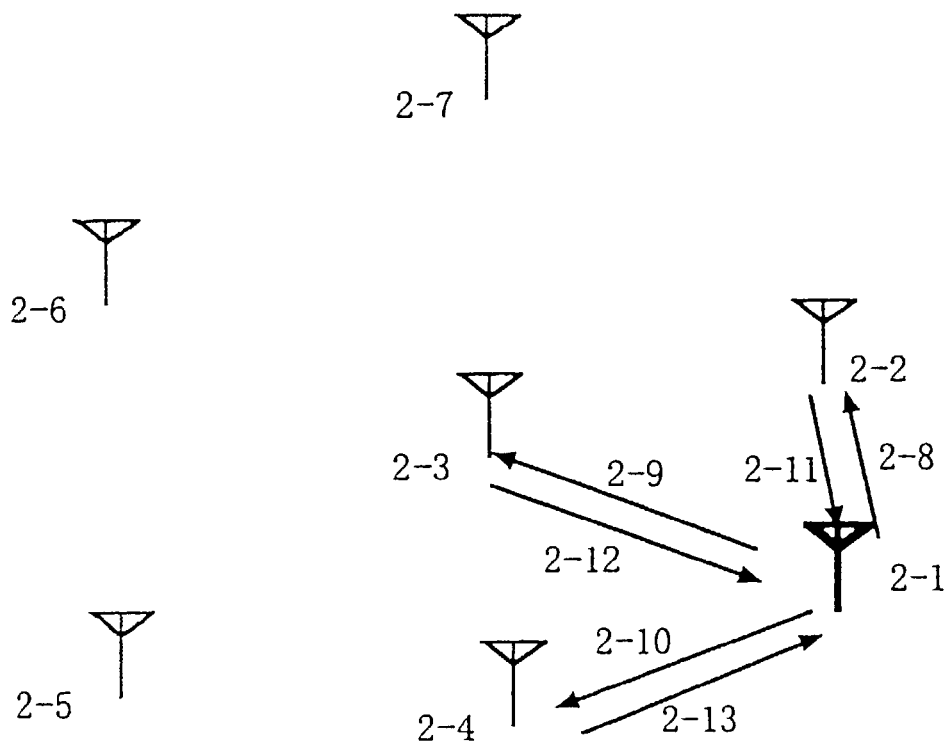
FIG. 2 shows signal transmissions between radio base stations.
FIG. 3 shows an administration table including the received levels of adjacent radio base stations.

Referring to FIG. 1, FIG. 2 and FIG. 3, the operation according to the present embodiment will be explained below.

In FIG. 1, it is assumed that the mobile station 1-8 is going to send or receive a call, or perform a handoff.

Before sending or receiving a call or performing a handoff, the mobile station 1-8 receives identification information and received levels of three adjacent radio base stations 1-2 through 1-4. The mobile station 1-8 sends a request for sending/receiving a call or handing-off to the radio base station 1-1 in service and reports the above identification information and received levels of three adjacent radio base stations 1-2 to 1-4 to the radio base station 1-1.

FIG. 2 shows signal transmissions between radio base station 2-1 that receives the report from the mobile station 1-8 and the adjacent radio base stations 2-2, 2-3 and 2-4.

Radio base stations 2-5 through 2-7 cannot communicate with the mobile station 1-8.

In FIG. 2, the radio base station 2-1 inquires (2-8, 2-9, 2-10) about radio channel availability of each of the three adjacent radio stations 2-2 through 2-4 indicated by the mobile station 1-8, if the radio base station 2-1 itself can not assign a radio channel to meet the call request of the mobile station 2-1 or if the radio base station 2-1 receives a handoff request from the mobile station 1-8. Upon being queried by the radio base station 2-1, the adjacent radio base stations 2-2 through 2-4 report their own radio channel availabilities to the radio base station 2-1 (2-11, 2-12, 2-13). Based on the reports from the mobile station 1-8 and the adjacent radio base stations 2-2 through 2-4, the radio base station 2-1 makes an administration table as shown in FIG. 3. The administration table includes received levels of the adjacent radio base stations measured by the mobile station, and available capacities of these bases stations. When the mobile station requires 32 kbps bandwidth, FIG. 3 shows that the adjacent radio base stations (renumbered from FIG. 2) 1-3 (64 kbps) and 1-4 (384 kbps) satisfy the bandwidth requirement.

On the other hand, the reported received levels of the base stations 1-3 and 1-4 are 43 dBm and 35 dBm, respectively. The base station 1-3 has the higher received level. At this time it is necessary to determine which of available capacity (bandwidth) or received level has higher priority. In this embodiment, the received level has higher priority than the available capacity when selecting an adjacent radio base station to communicate with the mobile station. Of course, the available capacity may have priority over the received level.

In the manner above, a radio base station is selected. It is assumed that the radio base station 1-3 is selected. The radio base station 1-1 instructs the mobile station 1-8 to send/receive a call or perform a handoff.

In the explanation above, the radio base station 1-1 searches the radio base stations 1-2 through 1-4 to for an available radio channel. However, the present invention is not limited to this manner, and may take other configurations in which, for example, the radio base station 1-1 directly notifies the mobile station of information about radio channels assigned by the selected radio base station.

As explained above, according to the present embodiment, when a mobile station is going to send/receive a call and a radio base station connected to the mobile station has no available radio channel, the radio base station in service can communicate with other adjacent radio base stations to find a radio base station that can provide a radio channel to the mobile station. Therefore, it is possible to assign a radio channel with high speed without having a radio base station control station. Because the mutual communications among the radio base stations determine the assignment of a radio channel to the mobile station, the traffic of control signals to select a radio base station is reduced. As a result, high speed call sending/receiving and handing-off can be attained, and it is possible to support a rapidly moving mobile station even in a micro-cell mobile communication system that needs frequent handoffs.

Figure 4:
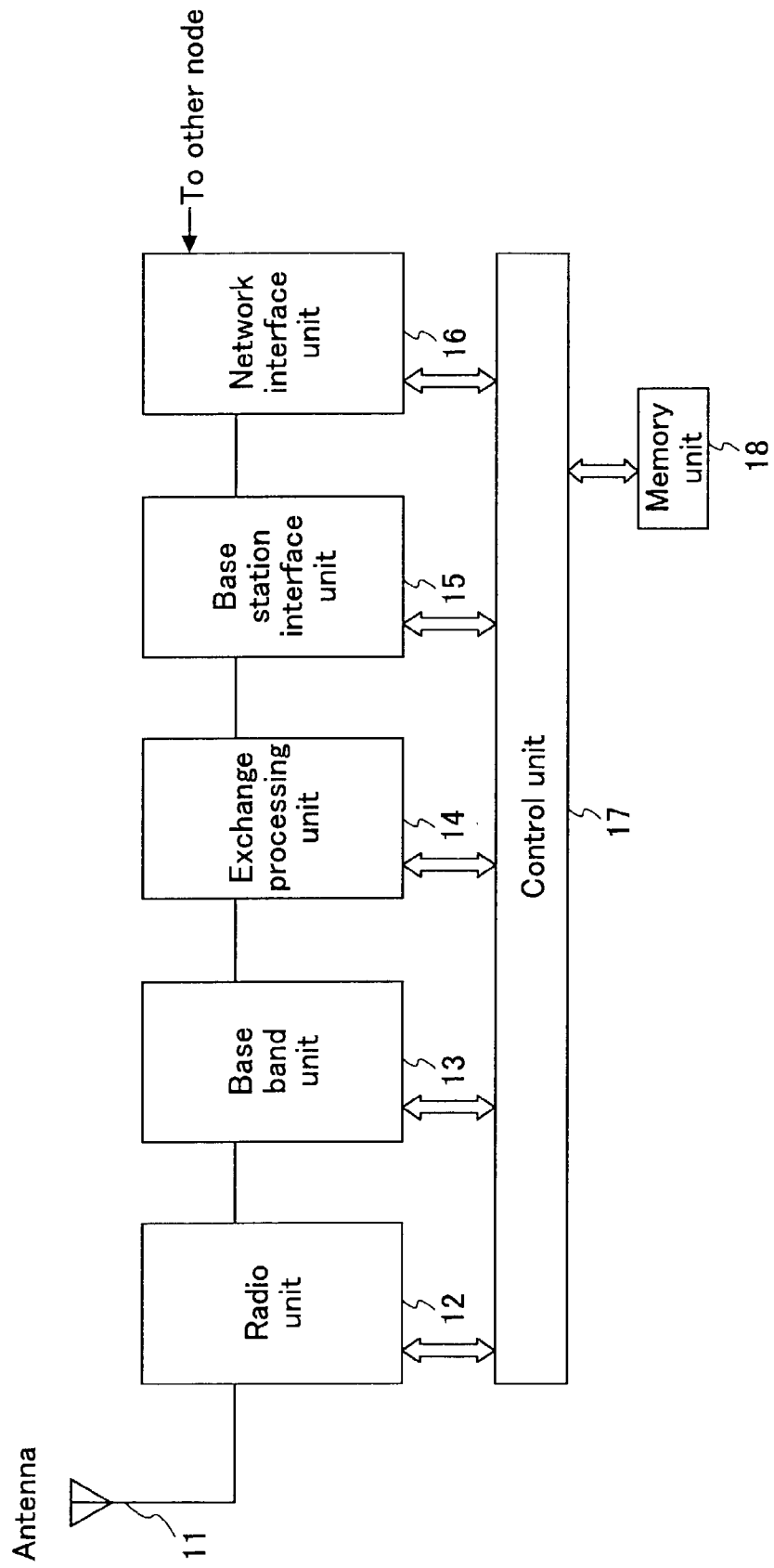
FIG. 4 shows a block diagram of a radio base station according to the embodiment of the present invention.

FIG. 4 shows a block diagram of a radio base station according to the embodiment of the present invention. Each radio base station 1-1 through 1-4 shown in FIG. 1 has the same structure, and therefore the radio base station 1-1 only will be explained as a representative example herein below.

In FIG. 4, the radio base station 1-1 has an antenna unit 11, a radio unit 12, a base band signal processing (BB) unit 13, an exchange processing unit 14, a base station interface (BS INTF) processing unit 15, a network interface (NW INTF) processing unit 16, a control unit 17 and a memory unit 18. In this embodiment, it is assumed that data transmissions between the radio base station 1-1 and the mobile station 1-8, and between the radio base station 1-1 and the adjacent radio base stations 1-2 through 1-4 are done by packet transmission. This packet may include addresses of transmitters and receivers and error check information in addition to data to be transmitted.

The radio unit 12 demodulates a radio signal received via the antenna 11 from the mobile station 1-8, and sends the demodulated signal to the BB unit 13. The BB unit 13 decodes the demodulated signal and sends resulting digital data to the exchange processing unit 14. The exchange processing unit 14 sends the digital data from the BB unit 13 to the BS INTF processing unit 15 by the packet. The BS INTF processing unit 15 is provided with a route selection function similar to a bridge or router used in a LAN, and the BS INTF performs 1) relaying packets sent from the exchange processing unit 14 in accordance with destination addresses, and 2) selecting routes for communications between radio base stations.

EXAMPLE 1 OF THE ABOVE PROCESSING

The BS INTF unit 15 checks the destination address of a packet received from the exchange processing unit 14 and passes (relays) the packet to the NW INTF unit 16 if the packet should be passed through. The NW INTF unit 16 transmits the received packet to its designated destination (predetermined communication network).

EEXMPLE 2 OF THE ABOVE PROCESSING

Addresses of radio base stations 1-2 through 1-4 indicated by the mobile station 1-8 are stored as one group address in the memory unit 18, and read out by the control unit 17 at a predetermined time. This group address read out by the control unit 17 is sent to the BS INTF processing unit 15 and accompanied by route information for sending a packet to each radio base station 1-2 through 1-4.

This packet with the route information is sent from the BS INTF processing unit 15 through the NW INTF processing unit 16 to each radio base station 1-2 through 1-4. Each radio base station 1-2 through 1-4 receives the packet by its own NW INTF processing unit 16, and takes packets addressed to itself only in and sends them to its own control unit 17.

The control unit 17 selects a radio base station to be connected to the mobile station 1-8 among the adjacent radio base stations, based on "answers" from the adjacent radio base stations 1-2 through 1-4 in response to an "inquiry" about channel availability. The memory unit 18 stores an administration table for each mobile station.

As explained above, the radio base station according to the embodiment of the present invention has a packet processing function to carry out packet communication, and therefore it is possible to easily achieve communication between radio base stations just by designating the packet's destination.

In this embodiment, NW INTF processing unit 16 is provided with a physical layer function for transmitting signals by wire communications. However, if radio communication between the radio base stations is desired, the physical layer of NW INTF processing unit 16 may have a radio function.

On the other hand, an inverse operation is performed on packets sent from a predetermined network. In this case, the BB unit 13 carries out encoding process, and coded packets are sent to the radio unit 12. After being modulated by the radio unit 12, the packets are transmitted from the antenna 11 to the mobile station 1-8.

Next, an operation performed in the radio base station in the embodiment of the present invention will be explained in detail with reference to FIGS. 5 and 6.

Figure 5:
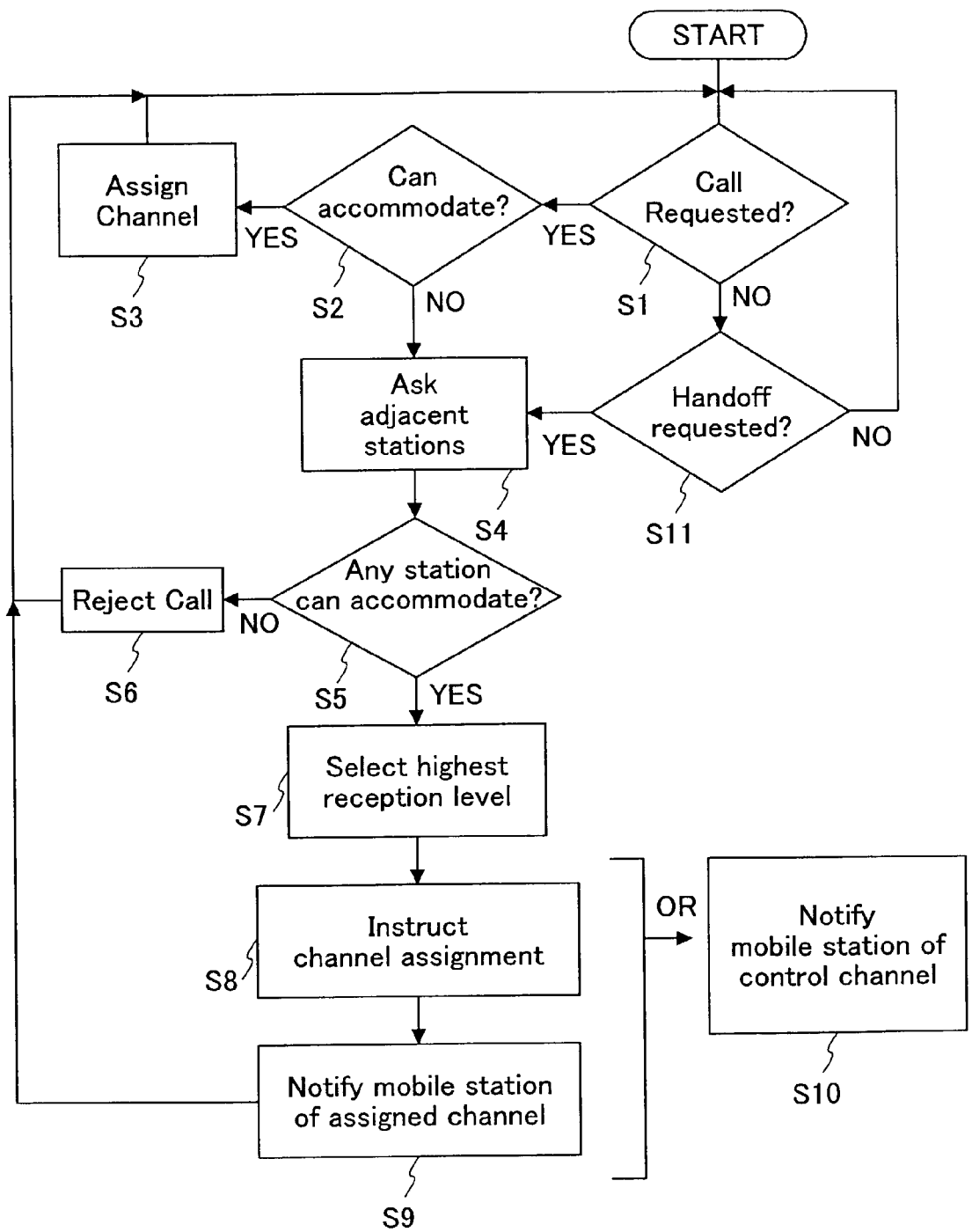
FIG. 5 shows a flowchart illustrating operation of the radio base station shown in FIG. 4 when receiving a call request and a handoff request.

FIG. 5 shows a flowchart illustrating an operation of the radio base station 1-1 when it receives a request for transmitting a call from the mobile station 1-8, a request for sending a call to the mobile station or a handoff request.

In FIG. 5, when the control unit 17 of the radio base station 1-1 receives (YES at step S1) a request for transmitting a call from the mobile station 1-8 or a request for sending a call to the mobile station 1-8 belonging to its radio zone, the control unit 17 determines (at step S2) whether its own radio base station 1-1 can accommodate the bandwidth required by the communication relating the mobile station 1-8, with reference to the channel availability stored in the memory unit 18. If the control unit 17 determines (YES at step S2) that its own station 1-1 can accommodate the bandwidth, the control unit 17 assigns a radio channel necessary for the mobile station 1-8 from its own radio channel resources, and returns to the beginning step. On the other hand, the control unit 17 determines (NO at step S2) that its own station cannot accommodate the bandwidth, and the control unit 17 sends (S4) a control signal via the radio unit 12 to the adjacent radio base stations 1-2 through 1-4 to ask (or inquire of) them about their channel using status or channel availability. The timing for sending the control signal is provided to the adjacent radio base stations 1-through 1-4 as well as the requests for sending a call to and from the mobile station 1-8.

After the control unit 17 of the radio base station 1-1 receives reports from the adjacent radio base stations 1-2 through 1-4 in response to the inquiry, it stores the reported channel availabilities of the adjacent radio base stations 1-2 through 1-4 in the memory unit 18 in a table format as shown in FIG. 3. The control unit 17 of the radio base station 1-1 reads out the table shown in FIG. 3 from the memory unit 18, and finds (step S5) a radio base station that can accommodate the mobile station 1-8 based on the FIG. 3 table. If the control unit 17 determines (NO at step S5) that there is no radio base station able to accommodate the mobile station, the control unit 17 sends (S6) a rejecting signal to the mobile station 1-8 via the radio unit 12.

On the other hand, when the control unit 17 determines (YES at step S5) that there are some radio base stations able to accommodate the mobile station 1-8, it selects (step S7) the radio base station having the highest received level among the adjacent radio base stations reported by the mobile station 1-8. For example, the radio base station 1-3 is selected.

After completing the selection of the adjacent radio base station in the above manner, the control unit 17 of the radio base station 1-1 instructs (step S8) the selected adjacent radio base station 1-3 to assign a radio channel to the mobile station via NW INTF unit 16. The instructed adjacent radio base station 1-3 reports information about the radio channel assigned according to the instruction, to the radio base station 1-1. The radio base station 1-1 notifies (S9) the mobile station 1-8 of the information about the assigned radio channel reported by the selected adjacent radio base station 1-3. And the mobile station 1-8 establishes connection with the selected adjacent radio base station 1-3 via the selected radio channel.

In the above embodiment, after selecting (step S7) an adjacent radio base station 1-3, the radio base station 1-1 instructs the selected radio base station 1-3 to assign a radio channel. However, the present invention is not limited to this embodiment, but may include other embodiments. For example, after selecting (step S7) an adjacent radio base station, the radio base station 1-1 may notify (step S10) the mobile station 1-8 of the frequency of the control channel of the selected base station. In this case, the mobile station 1-8 tries to connect with the selected radio base station using the selected control channel frequency.

When the mobile station 1-8 requests a handoff (NO at step S1, and YES at step S11), the radio base station 1-1 asks (or inquires) (step S4) the adjacent radio base stations indicated by the mobile station for their channel availabilities. The subsequent steps are the same as explained above.

As mentioned above, according to the embodiment of the present invention, if the radio base station in service has no available channel when receiving a request for sending a call to or from the mobile station, the radio base station in service can communicate with adjacent radio base stations surrounding the mobile station to find an available radio channel and notify the mobile station of the available radio channel. Because a radio base station having an available channel can be selected by communications among the radio base stations, there is no need for a radio base station controlling station. Therefore, it is possible to quickly find and select an available channel without increasing cost. And a required radio resource can be quickly assigned to a mobile station. According the embodiment of the present invention, because an available radio resource can be selected by direct communications among the radio base stations, there is no need for control signal transmission between a mobile station and radio base stations. Therefore, searching time until finding an available radio channel is reduced and connection delay due to sending calls to and from the mobile station is prevented from increasing.

Figure 6:
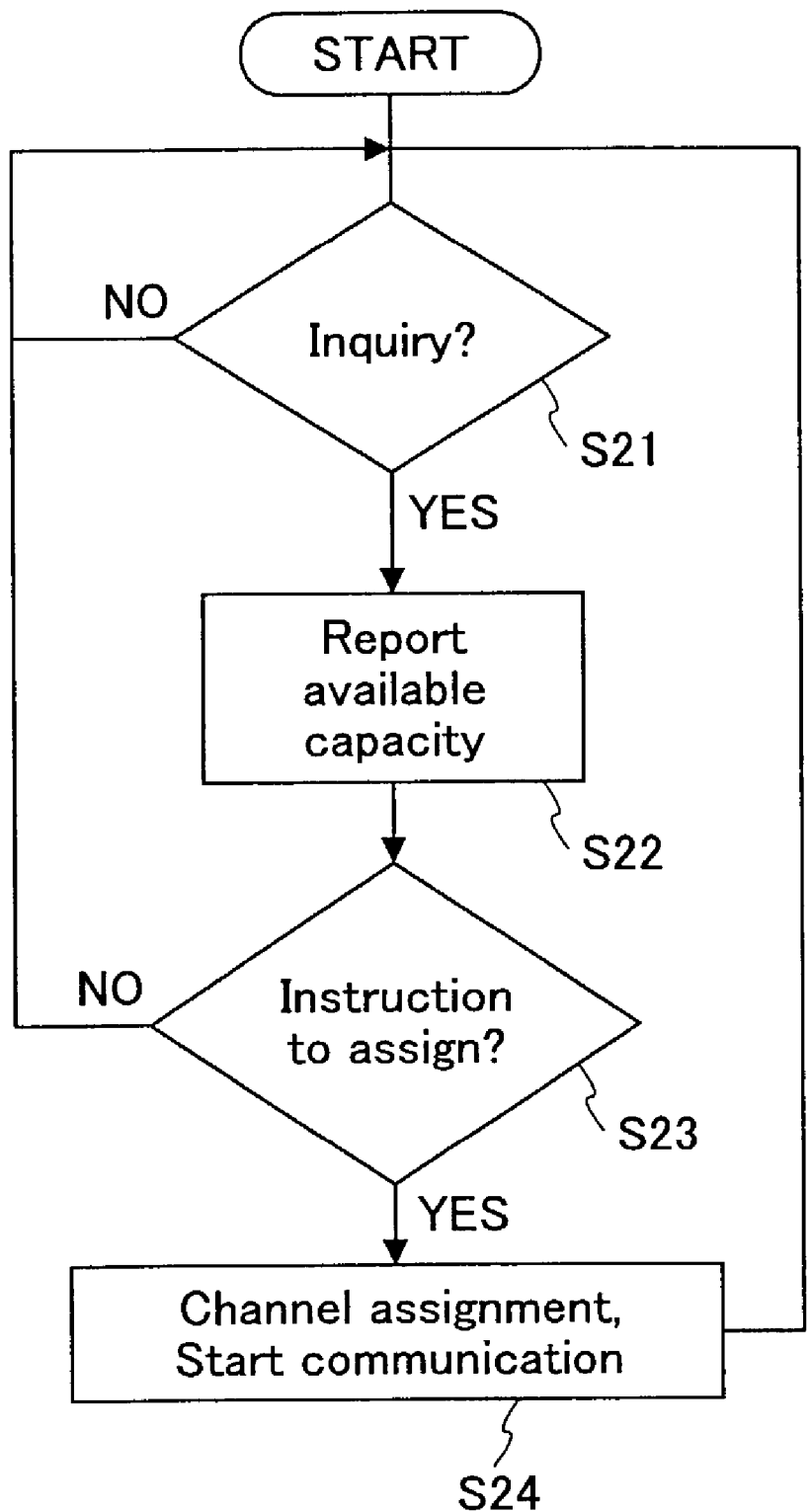
FIG. 6 shows a flowchart illustrating an operation of the radio base station shown in FIG. 4 as an adjacent radio base station.

FIG. 6 shows a flowchart illustrating an operation of a radio base station as an adjacent radio base station.

In FIG. 6, control unit 17 of an adjacent radio base station (referred to as "radio base station A") receives via a NW INTF processing unit 16, an inquiry from an adjoining radio base station (referred to as "radio base station B") which selects an adjacent radio station to be connected with a mobile station. The inquiry relates to radio channel availability. When receiving such inquiry (YES at step S21), the radio base station A extracts information about its own radio resources available capacity from memory unit 18, and reports (step S22) the information via NW INTF processing unit 16 to the inquiring radio base station B. If the control unit 17 of the radio base station A receives (YES at step S23) an instruction to assign a radio channel from the radio base station B via the BS INTF processing unit 15, the control unit 17 checks available radio channel information stored in the memory unit 18, and assigns (step S24) a radio channel necessary for communicating with the mobile station belonging to the radio base station B. The assigned radio channel is provided to the mobile station. The mobile station connects (step S24) to the assigned radio channel to start communication.

On the other hand, if the radio base station A does not receive (NO at step S21) an inquiry about radio channel availability from the radio base station B, it goes into waiting status. At step S23, if the radio base station does not receive instruction (NO) to assign a radio channel from the radio base station B after reporting its available capacity to the radio base station B, the radio base station A goes into waiting status.

Figure 7:
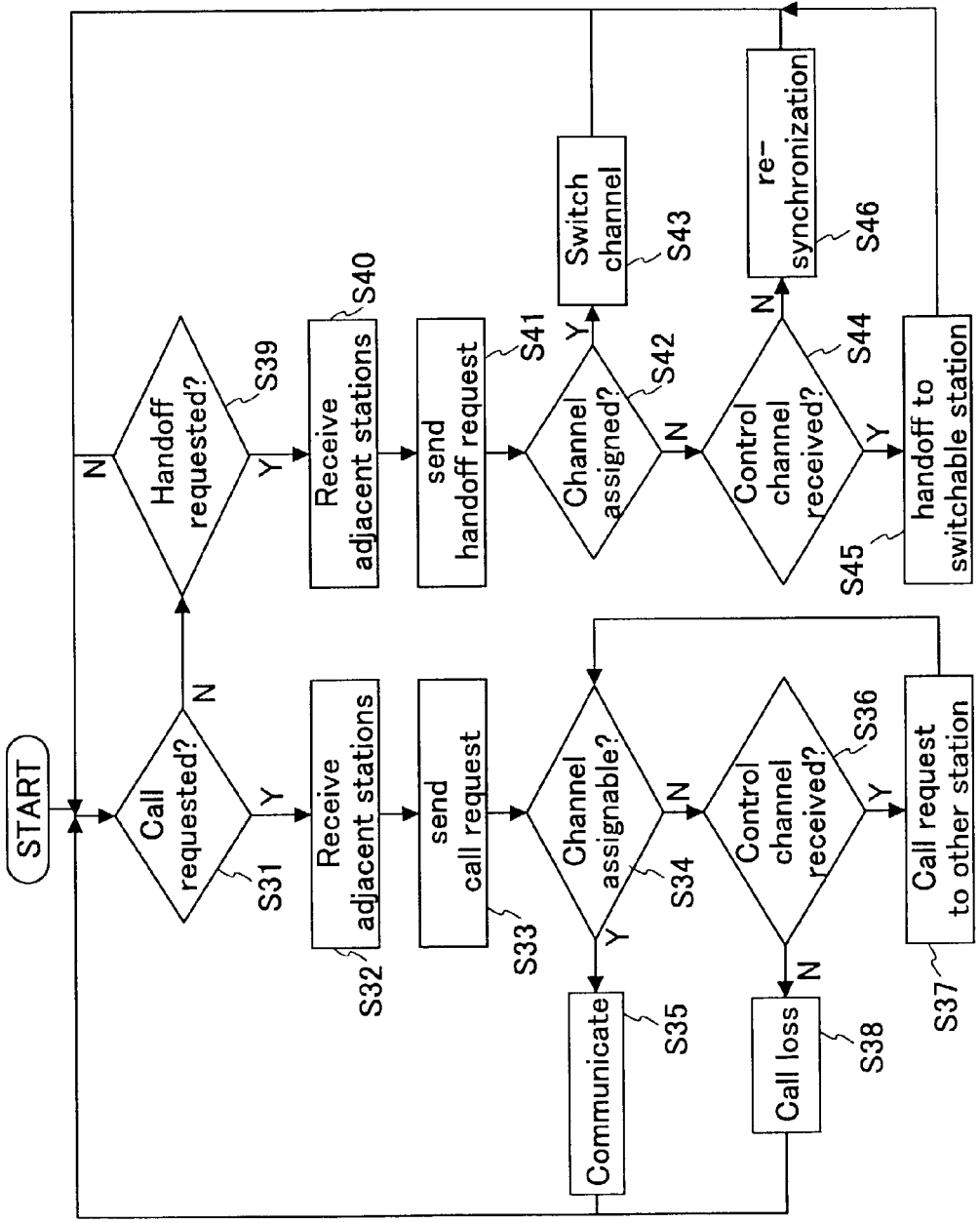
FIG. 7 shows a flowchart illustrating an operation of the mobile station according to one embodiment of the present invention.
Figure 8:
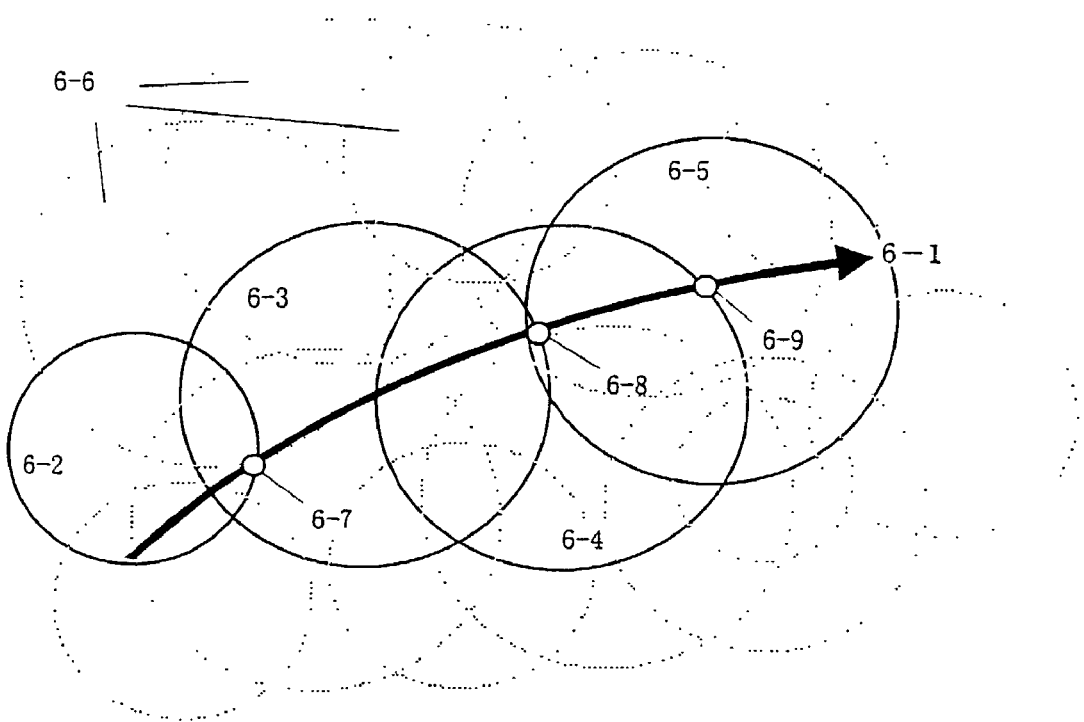
FIG. 8 shows a micro-cell mobile communication system and handoffs of a moving mobile station.

FIG. 7 shows a flowchart illustrating an operation of the mobile station.

In FIG. 7, when the mobile station 1-8 detects (YES at step S31) a request for sending a call to or from itself, it receives (step S32) alerting signals from the adjacent radio base stations 1-2 through 1-4, and stores base station numbers of the adjacent radio base stations and received levels thereof (adjacent radio base station information). Then the mobile station transmits a request signal for a call to the radio base station 1-1 in service. This time, the stored adjacent base station information is transmitted (S33) together with the request signal.

If the mobile station 1-8 is assigned (YES at step S34) a radio channel by the radio base station 1-1, the mobile station 1-8 tunes to the assigned radio channel to start communicating (step S35), and returns to the beginning step.

On the other hand, if the mobile station 1-8 is not assigned (NO at step S34) a radio channel by the radio base station 1-1, it is determined (step S36) whether the mobile station receives control channel frequencies of the adjacent radio base stations. If it is determined (YES at step S36) that the mobile station receives control channel frequencies of the adjacent radio base stations, the mobile station gives a request (S37) for a call to the adjacent radio base station that has transmitted the received control channel frequency. On the other hand, it is determined that the mobile station has not received (NO at step S36) any control channel frequency from the adjacent radio base stations, the mobile station cannot obtain a radio channel and loses a call (step S38).

When a handoff request is detected (NO at step S31 and YES at step S39), the mobile station 1-8 receives (S40) alerting signals from the adjacent radio base stations 1-2 through 1-4 in a manner similar to that explained above. Then the mobile station 1-8 stores adjacent radio base station information and sends a handoff request (S41). If the mobile station is assigned (YES at step S42) a radio channel of a radio base station to be switched to, it switches (step S43) to the assigned radio channel to perform a handoff. On the other hand, if the mobile station 1-8 is not assigned (NO at step S42) any radio channel to be switched to, and if it receives (YES at step S44) a control channel frequency of a radio base station that the mobile station can switch to, then the mobile station 1-8 carries out (45) a handoff to the switchable radio base station, in the same manner as explained above. If the mobile station 1-8 is not assigned (NO at step S42) any radio channel to be switched to, and if it does receive (NO at step S44) a control channel frequency of a radio base station that the mobile station can switch to, then the mobile station 1-8 carries out (46) re-synchronization with the radio base station in communication and gives up on the handoff.

By combining the radio base selection system according to the present invention and communication technology utilizing multiple radio base stations proposed in Japanese Patent Laid-open Publication No. 11-375795, it becomes possible to realize high speed radio resource allocation and high quality data transmission in the field of transmitting still images, dynamic picture images and a great amount of data.

In alternative embodiments of the present invention, the IP packet is transmitted on up and down links.

1. In a Case Where Multiple Radio Base Stations Simultaneously Receive

When a radio base station (referred to as "radio base station A") receives a request for transmitting a call from a mobile station, if the radio base station A has no available channel for accommodating the transmission call, then the radio base station A asks adjacent radio base stations about their available radio channel capacities or channel availabilities. The adjacent radio base stations report their channel availabilities to the radio base station A. Based on these reports, the radio base station A selects a plurality of adjacent radio base stations (referred to as "radio stations B, C) that can be connected to the mobile station, and notifies the mobile station of the selected radio base stations (notification of identification information).

The mobile station starts to communicate with the selected radio base stations B and C. Signals transmitted between the mobile station and the radio base stations are in the form of packets. Either one of the radio base stations B and C receiving packets from the mobile station operates as a parent station. This example assumes that the radio base station B is a parent station. The radio base station B as parent station receives packets forwarded from the radio base station C (a child station), combines the received packets with packets stored in its own station, and sends the combined packets to a terminal side connecting to the network.

In this alternative embodiment, because a plurality of radio base stations are first selected according to the radio base station selection method of the present invention, the speed of channel assignment to the mobile station can be improved. Because the selected multiple radio base stations simultaneously receive packets sent from the mobile station and the received packets are forwarded to and combined by the parent radio base station, the quality of upward signal transmission can be improved.

2. In a Case Where Multiple Radio Base Stations Simultaneously Transmit

When the radio base station A receives a request for sending a call to a mobile station belonging to itself, if the radio base station A has no available channel for accommodating the call, then the radio base station A asks adjacent radio base stations about their available radio channel capacities or channel availabilities. The adjacent radio base stations report their channel availabilities to the radio base station A. Based on these reports, the radio base station A selects a plurality of adjacent radio base stations B, C that can be connected to the mobile station, and notifies the mobile station of the selected radio base stations (notification of identification information).

The radio base station A duplicates one packet sent from a transmitting terminal, and forwards the duplicated packet to the selected radio base stations B, C. The radio base stations B, C simultaneously or sequentially transmit the duplicated packets to the mobile station. These packets are combined by the mobile station.

In this further alternative embodiment, because a plurality of radio base stations are first selected according to the radio base station selection method of the present invention, the speed of channel assignment to the mobile station can be improved. Because the radio base stations B, C transmit the duplicated packets to the mobile station and the mobile station combines the received packets, the quality of downward signal transmission can be improved.

According to the alternative embodiments, the radio transmission between the mobile station and the radio base stations is in the form of IP. Radio resources (available radio channels) can be quickly allocated to the mobile station even a in case where multimedia information is transmitted, and the qualities of upward and downward links are improved.

In the embodiments described above, the base station selecting function of the control unit 17 of the radio base station 1-1 corresponds to a radio base station selecting means, and the radio communicating function of the radio unit 12 corresponds to a radio channel availability requiring means, notifying means, radio channel assignment instruction means and radio channel information notifying means.

According to the embodiments of the present invention, even if a radio base station receiving a call request or a handoff request has no available radio channel, the radio base station can search adjacent radio base stations for an available radio channel using radio communications between the radio base stations, and notify the mobile station of an available radio channel. Therefore, an available radio channel can be assigned to the mobile station without a radio base station controlling station. Because the radio channel allocation to the mobile station is performed among the radio base stations, high speed call transmission/reception and high speed handoff can be obtained. And therefore high mobility of the mobile station can be realized in a micro-cell mobile communication system requiring frequent handoffs. Because the mobile station communicates with multiple radio base stations, high speed channel allocation and high quality information transmission can be obtained, even when upward and downward communication traffic increases.

According to the other embodiments of the present invention, a radio base station can be realized, which can select other radio base stations capable of communicating with a mobile station.

Further, the present invention is not limited to these embodiments, but various variations and modifications may be made without departing from the scope of the present invention.

The present application is based on Japanese priority application No. 2001-218379 filed on Jul. 18, 2001, with the Japanese Patent Office, the entire contents of which are hereby incorporated by reference.

What is claimed is:

1. In a mobile communication system having a plurality of radio base stations and a mobile station, a radio base station selection method in which a radio base station to start communicating with a mobile station is selected from among adjacent radio base stations capable of communicating with the mobile station, the method comprising the steps of:

measuring, by a mobile station, a reception quality of each of a plurality of adjacent radio base stations;

receiving, by a radio base station in service, a signal including a connection request and the measured reception quality of each of the plurality of adjacent radio base stations from the mobile station;

transmitting, by the radio base station in service, to each adjacent radio base station, but not to the mobile station, a message requesting a radio channel available capacity report;

making the radio channel available capacity report by each adjacent radio base station, but not by the mobile station;

sending the radio channel available capacity report directly from said each adjacent radio base station, but not from the mobile station, to the radio base station in service, each radio channel available capacity report including an available bandwidth of the respective adjacent radio base station;

making, by the radio base station in service, a table including the reception qualities measured by the mobile station and the radio channel available capacity reports directly obtained from the adjacent radio base stations;

selecting, by the radio base station in service, but not by a radio base station control station or an adjacent radio base station, a radio base station to be connected to the mobile station, based on the table; and notifying the mobile station of information necessary for communicating with the selected radio base station.

2. The radio base station selection method as claimed in claim 1, wherein the signal for requesting connection from the mobile station is a signal relating to sending a call to or from the mobile station.

3. The radio base station selection method as claimed in claim 1, wherein the signal for requesting connection from the mobile station is a signal relating to a handoff request.

4. The radio base station selection method as claimed in claim 1, wherein the radio base station in service selects one radio base station satisfying a predetermined receiving quality, from among more than one adjacent radio base stations having radio channel available capacity necessary for accommodating the connection to the mobile station, based on the radio channel available capacity reports directly obtained from the adjacent radio base stations.

5. The radio base station selection method as claimed in claim 1, wherein the radio base station in service notifies the mobile station of identification information about the selected radio base station; and the mobile station establishes connection to the selected radio base station identified by the identification information provided by the radio base station in service.

6. The radio base station selection method as claimed in claim 1, wherein the radio base station in service instructs the selected radio base station to assign a radio channel to the mobile station;

the selected radio base station reports information about the radio channel assigned according to the instruction, to the radio base station in service;

the radio base station in service notifies the mobile station of the reported information about the radio channel; and the mobile station communicates with the selected radio base station using the assigned radio channel.

7. In a mobile communication system having a plurality of radio base stations and a mobile station, a radio base station selection system in which a radio base station to start communicating with a mobile station is selected from among adjacent radio base stations capable of communicating with the mobile station, the system comprising a radio base station in service, the mobile station including means for measuring a reception quality of each of a plurality of adjacent radio base stations;

the radio base station in service including:

radio channel available capacity requiring means for requiring a radio channel available capacity report from each adjacent radio base station, but not from the mobile station, when receiving a signal for requesting connection and including the measured reception quality from the mobile station;

means for receiving the radio channel available capacity reports directly from said each adjacent radio base station, but not from the mobile station, each radio channel available capacity report including an available bandwidth of the respective adjacent radio base station;

means for making, by the radio base station in service, a table including the reception qualities measured by the mobile station and the radio channel available capacity reports directly obtained from the adjacent radio base stations;

radio base station selecting means for selecting by the radio base station in service, but not by a radio base station control station or an adjacent radio base station, a radio base station to be connected to the mobile station, based on the table; and notifying means for notifying the mobile station of information necessary for communicating with the selected radio base station.

8. The radio base station selection system as claimed in claim 7, wherein the signal for requesting connection from the mobile station is a signal relating to sending a call to or from the mobile station.

9. The radio base station selection system as claimed in claim 7, wherein the signal for requesting connection from the mobile station is a signal relating to a handoff request.

10. The radio base station selection system as claimed in claim 7, wherein
the radio base station selecting means selects one radio base station satisfying a predetermined receiving quality, from among more than one adjacent radio base stations having radio channel available capacity necessary for accommodating the connection to the mobile station, based on the radio channel available capacity reports directly obtained from the adjacent radio base stations.

11. The radio base station selection system as claimed in claim 7, wherein
the notifying means notifies the mobile station of identification information about the selected radio base station; and
the mobile station establishes connection to the selected radio base station identified by the identification information provided by the notifying means.

12. The radio base station selection system as claimed in claim 7, further comprising:
radio channel assignment instruction means for instructing the selected radio base station to assign a radio channel to the mobile station;
wherein the selected radio base station includes radio channel information reporting means for reporting information about the radio channel assigned according to the instruction, to the radio base station in service;
the radio base station in service includes radio channel information notifying means for notifying the mobile station of the reported information about the radio channel; and
the mobile station communicates with the selected radio base station using the assigned radio channel.

13. A radio base station in service and communicating with a mobile station capable of measuring a reception quality of each of a plurality of adjacent radio base stations, comprising:
radio channel available capacity requiring means for receiving a signal including a connection request and the measured reception quality from the mobile station, and for requesting a radio channel available capacity report from each adjacent radio base station, but not from the mobile station;
means for receiving the radio channel available capacity reports directly from said each adjacent radio base station, but not from the mobile station, each radio channel available capacity report including an available bandwidth of the respective adjacent radio base station;
means for making, by the radio base station in service, a table including the reception qualities measured by the mobile station and the radio channel available capacity reports directly obtained from the adjacent radio base stations;
radio base station selecting means for selecting, by the radio base station in service, but not by a radio base station control station or an adjacent radio base station, a radio base station to be connected to the mobile station, based on the table; and
notifying means for notifying the mobile station of information necessary for communicating with the selected radio base station.

14. The radio base station as claimed in claim 13, wherein the signal for requesting connection from the mobile station is a signal relating to sending a call to or from the mobile station.

15. The radio base station as claimed in claim 13, wherein the signal for requesting connection from the mobile station is a signal relating to a handoff request.

16. The radio base station as claimed in claim 13, wherein
the radio base station selecting means selects one radio base station satisfying a predetermined receiving quality, from among more than one adjacent radio base stations having radio channel available capacity necessary for accommodating the connection to the mobile station, based on the radio channel available capacity reports directly obtained from the adjacent radio base stations.

17. The radio base station as claimed in claim 13, wherein
the notifying means notifies the mobile station of identification information about the selected radio base station; and
the mobile station establishes connection to the selected radio base station identified by the identification information provided by the notifying means.

18. The radio base station as claimed in claim 13, further comprising:
radio channel assignment instruction means for instructing the selected radio base station to assign a radio channel to the mobile station; and
radio channel information notifying means for notifying the mobile station of information about the radio channel assigned according to the instruction.

19. The radio base station as claimed in claim 18, wherein
the radio base station instructed to assign a radio channel by the radio channel assignment instruction means reports information about the assigned radio channel according to the instruction, to the in service radio base station.

* * * * *